United States Patent
Falk et al.

(10) Patent No.: US 9,659,425 B2
(45) Date of Patent: May 23, 2017

(54) ELECTRONIC KEY FOR AUTHENTICATION

(75) Inventors: Rainer Falk, Erding (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 213 days.

(21) Appl. No.: 13/320,483

(22) PCT Filed: Mar. 19, 2010

(86) PCT No.: PCT/EP2010/053608
§ 371 (c)(1),
(2), (4) Date: Nov. 14, 2011

(87) PCT Pub. No.: WO2010/130489
PCT Pub. Date: Nov. 18, 2010

(65) Prior Publication Data
US 2012/0066741 A1    Mar. 15, 2012

(30) Foreign Application Priority Data
May 13, 2009    (DE) .................. 10 2009 021 011

(51) Int. Cl.
*G06F 7/04* (2006.01)
*G07F 7/12* (2006.01)
(Continued)

(52) U.S. Cl.
CPC ........... *G07F 7/125* (2013.01); *G06Q 20/341* (2013.01); *G07F 7/10* (2013.01)

(58) Field of Classification Search
CPC .......... G06F 21/34; G06F 21/32; G06F 21/31; G06F 21/77; G06F 21/40; G06Q 20/4014; G06Q 20/40145; G06Q 20/3574; G06Q 20/3674; G06Q 20/409; G06Q 20/341; G07F 7/1008; G07F 7/10; G07F 7/08;
(Continued)

(56) References Cited

U.S. PATENT DOCUMENTS

| 4,034,211 A | 7/1977 | Horst et al. ................. 235/61.12 |
| 5,616,904 A | 4/1997 | Fernadez ...................... 235/449 |

(Continued)

FOREIGN PATENT DOCUMENTS

WO    2004/035321 A1    4/2004    ............. B42D 15/00

OTHER PUBLICATIONS

International PCT Search Report, PCT/EP2010/053608, 16 pages, Mailed Jun. 16, 2010.

*Primary Examiner* — Mohammed Waliullah
(74) *Attorney, Agent, or Firm* — Slayden Grubert Beard PLLC

(57) ABSTRACT

An electronic key supports a plurality of authentication methods and effectively prevents bidding-down attacks. For this purpose, security information is additionally provided by the electronic key, based on which a card reading device recognizes which authentication methods are supported by the electronic key. When the reading device recognizes based on said information that the electronic key supports a stronger second authentication method, but the authentication method was not recognized by the card reading device, the electronic key is, for example, rejected.

14 Claims, 2 Drawing Sheets

(51) Int. Cl.
*G06Q 20/34* (2012.01)
*G07F 7/10* (2006.01)

(58) Field of Classification Search
CPC .......... G07F 7/1091; G07F 7/12; G07F 7/125; H04W 12/06; H04L 9/3231; H04L 63/0807; H04L 63/0823; H04L 63/083; H04L 63/0861
USPC ........ 726/2–4; 713/185; 340/5.6, 5.64, 5.65, 340/5.66; 235/380–382
See application file for complete search history.

(56) References Cited

U.S. PATENT DOCUMENTS

| | | | |
|---|---|---|---|
| 5,786,587 A * | 7/1998 | Colgate, Jr. ............ | G06K 19/14 235/454 |
| 7,080,782 B2 * | 7/2006 | Charrin ................ | G06K 7/0004 235/451 |
| 7,588,180 B1 * | 9/2009 | Carmichael ........ | G06K 7/10079 235/379 |
| 7,769,999 B2 * | 8/2010 | Cao et al. ..................... | 713/155 |
| 8,028,896 B2 * | 10/2011 | Carter et al. .................. | 235/379 |
| 8,341,731 B2 * | 12/2012 | Ueda ................. | 726/20 |
| 8,594,730 B2 * | 11/2013 | Bona ................ | G06K 19/06187 455/550.1 |
| 8,783,578 B2 * | 7/2014 | Kim .............. | G06K 19/07707 235/492 |
| 2002/0169608 A1 * | 11/2002 | Tamir .................. | B32B 37/182 704/246 |
| 2003/0012382 A1 * | 1/2003 | Ferchichi et al. ............ | 380/270 |
| 2003/0043488 A1 | 3/2003 | Fernandez et al. ............ | 360/32 |
| 2005/0015281 A1 * | 1/2005 | Clark ................ | A63B 24/0006 705/2 |
| 2006/0081700 A1 * | 4/2006 | Li .......................... | G06K 19/07 235/380 |
| 2006/0157559 A1 * | 7/2006 | Levy .................... | G06K 17/00 235/380 |
| 2007/0067642 A1 * | 3/2007 | Singhal ........................ | 713/186 |
| 2007/0168677 A1 * | 7/2007 | Kudo et al. .................. | 713/185 |
| 2007/0234408 A1 * | 10/2007 | Burch et al. ...................... | 726/6 |
| 2008/0180212 A1 * | 7/2008 | Aikawa et al. ................ | 340/5.83 |
| 2009/0007232 A1 * | 1/2009 | Kasatani ......................... | 726/2 |
| 2009/0045257 A1 * | 2/2009 | Maus .................... | G06K 19/07 235/382 |

* cited by examiner

ELECTRONIC KEY FOR AUTHENTICATION

CROSS-REFERENCE TO RELATED APPLICATIONS

This application is a U.S. National Stage Application of International Application No. PCT/EP2010/053608 filed Mar. 19, 2010, which designates the United States of America, and claims priority to German Application No. 10 2009 021 011.3 filed May 13, 2009. The contents of which are hereby incorporated by reference in their entirety.

TECHNICAL FIELD

The invention relates to an electronic key for authentication of a user and to a method and a system for authentication of a user by means of an electronic key and a reading device.

BACKGROUND

Authentication methods for security-critical services often have to be replaced over time by newer and better methods. One example of this is the EC card, whose original version allowed information stored in an existing magnetic strip to be used in conjunction with a PIN (Personal Identification Number) for the purpose of authorizing access to an associated account. However, there has recently been an increasing number of so-called skimming attacks, in which the card is copied by means of additional devices attached to the automatic teller machines and the PIN is illicitly obtained by suitable technical means. The contents of the magnetic strip are then copied to a new card, thereby allowing unauthorized access to the account. The data from the magnetic strip is usually encrypted or protected by a cryptographic checksum, such that the information cannot be read without knowledge of the central key. However, an unauthorized user who has copied the entire magnetic strip and is in possession of the PIN does not need this central key.

In the meanwhile, newer EC cards therefore support an integrated smartcard, which cannot be copied as easily as a magnetic strip. This offers considerably greater security than the magnetic strip-based method. In order to ensure backwards compatibility with existing systems, the magnetic strip-based method is nonetheless still supported, thereby avoiding the need to replace all automatic teller machines at the same time.

The automatic teller machine or card reader checks the presence of a contacted smartcard chip by means of a galvanic connection to the chipcard contacts on the card. The presence of a smartcard chip can be detected, for example, because it transmits an ATR message (answer to reset) when the supply voltage is applied. If a smartcard chip is detected, the smartcard-based authentication method is used instead of the magnetic card-based authentication method. If no smartcard chip is detected, however, the existing magnetic strip-based authentication method is used.

In this context, the problem arises that it is still easy to copy the magnetic strip of cards which support both the magnetic strip-based authentication method and the smartcard-based authentication method. A copied card is then also accepted by automatic teller machines which would actually support both the magnetic strip-based authentication method and the smartcard-based authentication method. Such attacks are also called "bidding-down" attacks.

Bidding-down attacks are known in the context of security protocols for authentication and key negotiation. An authentication protocol supports a plurality of variants having various strengths. The two communication partners initially exchange information relating to the variants that are supported in each case. The strongest of the variants supported by both is selected and used in the protocol routine. Since the initial information exchange is not yet cryptographically protected against tampering, however, an unauthorized user can manipulate the exchanged information in such a way that a weak method is selected, although both communication partners would also support strong methods. In order to achieve this, the unauthorized user pretends that a communication partner only supports this weak variant. As a countermeasure, many protocols check the integrity of the initial information exchange retrospectively when the authentication and key negotiation are complete. Checksums are calculated, transferred and verified for this purpose.

SUMMARY

According to various embodiments, an electronic key can be specified which supports a plurality of authentication methods and prevents the aforementioned bidding-down attacks.

According to an embodiment, in an electronic key for authentication of a user, the authentication can be performed by means of at least two authentication methods in each case, and separate security information is stored for an authentication method in each case, said security information being readable via at least one interface, wherein the security information relating to a first authentication method includes information relating to the support for at least one further authentication method.

According to a further embodiment, the at least one interface can be designed as a contacted chipcard, contactless chipcard or magnetic strip. According to a further embodiment, the integrity of the information relating to the support for a further authentication method can be protected by a cryptographic checksum. According to a further embodiment, the information relating to the support for a further authentication method can be retrieved from a server.

According to another embodiment, in a method for authentication of a user by means of a reading device and an electronic key as described above, the following steps can be carried out by the reading device: —ascertaining first authentication methods supported by the electronic key, —selecting an authentication method from the supported first authentication methods according to a predefinable rule, —reading security information relating to the selected authentication method, —ascertaining supported second authentication methods on the basis of the security information, —verifying the selected authentication method on the basis of the supported second authentication methods according to a predefinable checking rule, such that —the authentication using the selected authentication method is continued if a verification result conforms to the checking rule, —the authentication using the selected authentication method is prevented if a verification result does not conform to the checking rule. According to a further embodiment of the method, the authentication using the electronic key can be prevented.

According to yet another embodiment, a system for authentication of a user, may comprise —an electronic key having means for performing at least two authentication methods, wherein separate security information is stored for an authentication method in each case, said security information being readable via at least one interface, and wherein the security information relating to a first authentication method includes information relating to the support for at least one further authentication method, —a reading device having means for ascertaining further supported authentication methods on the basis of the security information that is read, and for verifying a selected authentication method on the basis of the further supported authentication methods according to a predefinable checking rule, such that —the authentication using the selected authentication method is continued if a verification result conforms to the checking rule, —the authentication using the selected authentication method is prevented if a verification result does not conform to the checking rule.

BRIEF DESCRIPTION OF THE DRAWINGS

The present invention is explained in greater detail below with reference to exemplary embodiments and with reference to the drawings, in which.

DETAILED DESCRIPTION

Figure 1:
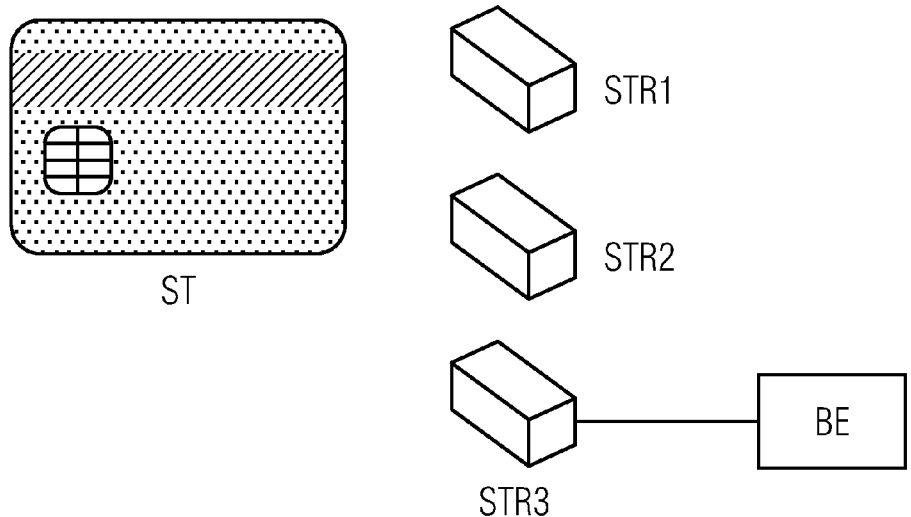
FIG. 1 shows a schematic illustration of a system for authentication comprising an electronic key (ST) and three card reading devices (STR1, STR2, STR3)

The electronic key (security token) according to various embodiments for authentication of a user supports at least two authentication methods, wherein separate security information is stored for an authentication method in each case. The respective security information can be read via at least one interface. The security information relating to a first authentication method includes information relating to the support for at least one further authentication method.

Without restricting the general applicability of the term, an electronic key comprises security tokens which store at least one item of security information relating to the authentication of a user. In this case, it can be identification information or a cryptographic key for authentication of a user. The electronic key can be realized in different module formats, e.g. as a chipcard, a USB stick or a memory card. Furthermore, the electronic key has different interfaces, these being designed in the form of e.g. a chipcard interface, USB interface, memory card interface (SD card, MMC card) or wireless interface. The interface can also take the form of a magnetic strip or a machine-readable zone.

According to various embodiments, an electronic key (security token) may support at least two authentication methods of different types. Security information that is assigned in each case to the respective authentication method is stored separately on the electronic key and can be read via different interfaces of the electronic key. Included as part of the security information relating to the first authentication method is information relating to the support for the second authentication method. For example, the presence of a smartcard chip on the card is encoded on the magnetic strip of an EC card. This information is encrypted using a system key of the issuing bank, for example, such that the information relating to the presence of the smartcard chip is likewise protected.

A card reading device therefore advantageously detects which authentication methods are supported by the electronic key. If the reading device detects, on the basis of this information, that the electronic key supports a stronger second authentication method, but this authentication method was not detected by the card reading device, the electronic key is rejected, for example.

In an embodiment, the information relating to the support for a further authentication method is stored on a server. The information can be requested from this server by the card reading device.

The method for authentication of a user by means of a reading device and an electronic key according to various embodiments comprises the following steps, which are performed by the reading device: The first authentication methods supported by the electronic key are ascertained. An authentication method is selected from the supported first authentication methods according to a rule (policy) that can be predefined. Security information relating to the selected authentication method is read. On the basis of the security information that has been read, supported second authentication methods are ascertained. On the basis of the supported second authentication methods, the selected authentication method is verified according to a predefinable checking rule (checking policy), such that the authentication using the selected authentication method is continued if the verification result conforms to the checking rule, and the authentication using the selected authentication method is prevented if the verification result does not conform to the checking rule.

The system for authentication of a user according to various embodiments features an electronic key comprising means for performing at least two authentication methods, wherein separate security information is stored in each case for an authentication method and can be read in each case via at least one interface, and wherein the security information relating to a first authentication method features information relating to the support for at least one further authentication method. The system also features a reading device comprising means for ascertaining further supported authentication methods on the basis of the security information that has been read, and means for verifying a selected authentication method on the basis of the further supported authentication methods according to a predefinable checking rule, such that the authentication using the selected authentication method is continued if the verification result conforms to the checking rule, and the authentication using the selected authentication method is cancelled if the verification result does not conform to the checking rule.

FIG. 1 shows an electronic key ST which supports a magnetic strip-based authentication method and a chipcard-based authentication method. Using the smartcard chip, communication is effected via the contact pads on the top side of the card. Three card reading devices STR1, STR2 and STR3 are also depicted in FIG. 1. The first card reading device STR1 only supports the magnetic strip-based authentication method, while the second card reading device STR2 supports both the smartcard-based authentication method and the magnetic strip-based authentication method. The third card reading device STR3 is connected to a backend system BE via a communication network that is not shown. Using this connection, the card reading device STR3 can obtain information from the backend system BE on the basis of the identification data that is read out from the electronic key ST. The card reading device STR3 likewise supports both the magnetic strip-based authentication method and the smartcard-based authentication method.

According to various embodiments, the security of the superior smartcard-based authentication method is consistently retained, since a bidding-down attack to the weaker magnetic strip-based authentication method is not possible. This means that a card reading device which also supports a strong authentication variant (e.g. STR2 and STR3) can no longer be duped into using the weaker authentication variant of an electronic key that also supports the strong variant.

Even if both the electronic key ST and the reading device STR2 or STR3 support authentication using the magnetic strip, the various embodiments ensure that a bidding-down unauthorized user is unable to use this weaker authentication method, if both the electronic key ST and the card reading device STR2 or STR3 support the superior authentication method. The weak authentication method is only used if the electronic key ST or the card reading device STR1 actually does support only the weaker authentication variant.

Consequently, the security of an electronic key (security token) which supports a plurality of variants of authentication methods, and the security of an authentication method using this electronic key are increased. It is not sufficient to compromise one of these variants, but a plurality or generally all of the supported variants must be replicated on a replicated (cloned) electronic key. This significantly increases the cost of a successful attack and therefore also the security against a successful attack.

Applications include all methods in which migration occurs from a weak authentication technology to a further, stronger authentication technology.

Figure 2:
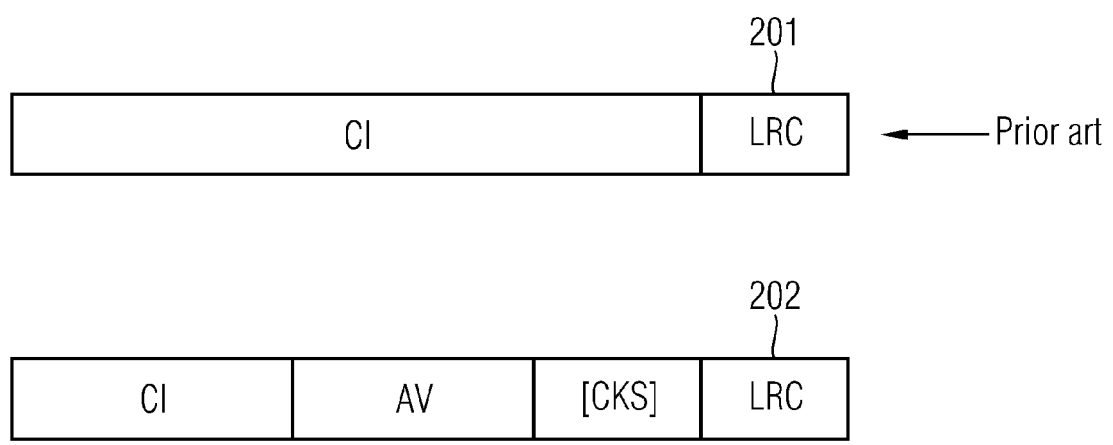
FIG. 2 shows a schematic illustration of information that is stored on a magnetic strip according to the prior art and according to various embodiments.

FIG. 2 shows a schematic illustration of information that is stored on a magnetic strip. In the prior art 201, information such as e.g. purpose, issuer, account number and cardholder name is stored by means of the card CI (card information). A checksum LRC (longitudinal redundancy check) is provided for protection against read errors.

According to various embodiments, additional information is provided 202. For example, information relating to further supported authentication methods AV is provided. This information relating to further supported authentication methods is optionally protected by a separate cryptographic checksum CKS, e.g. in the form of a message authentication code. The cryptographic checksum is calculated using the fields CI and AV, for example.

According to an embodiment, authorizations or services can be associated with the strength of the selected authentication. This allows e.g. new services to be associated with the stronger authentication methods, thereby preventing misuse of older cards.

Figure 3:
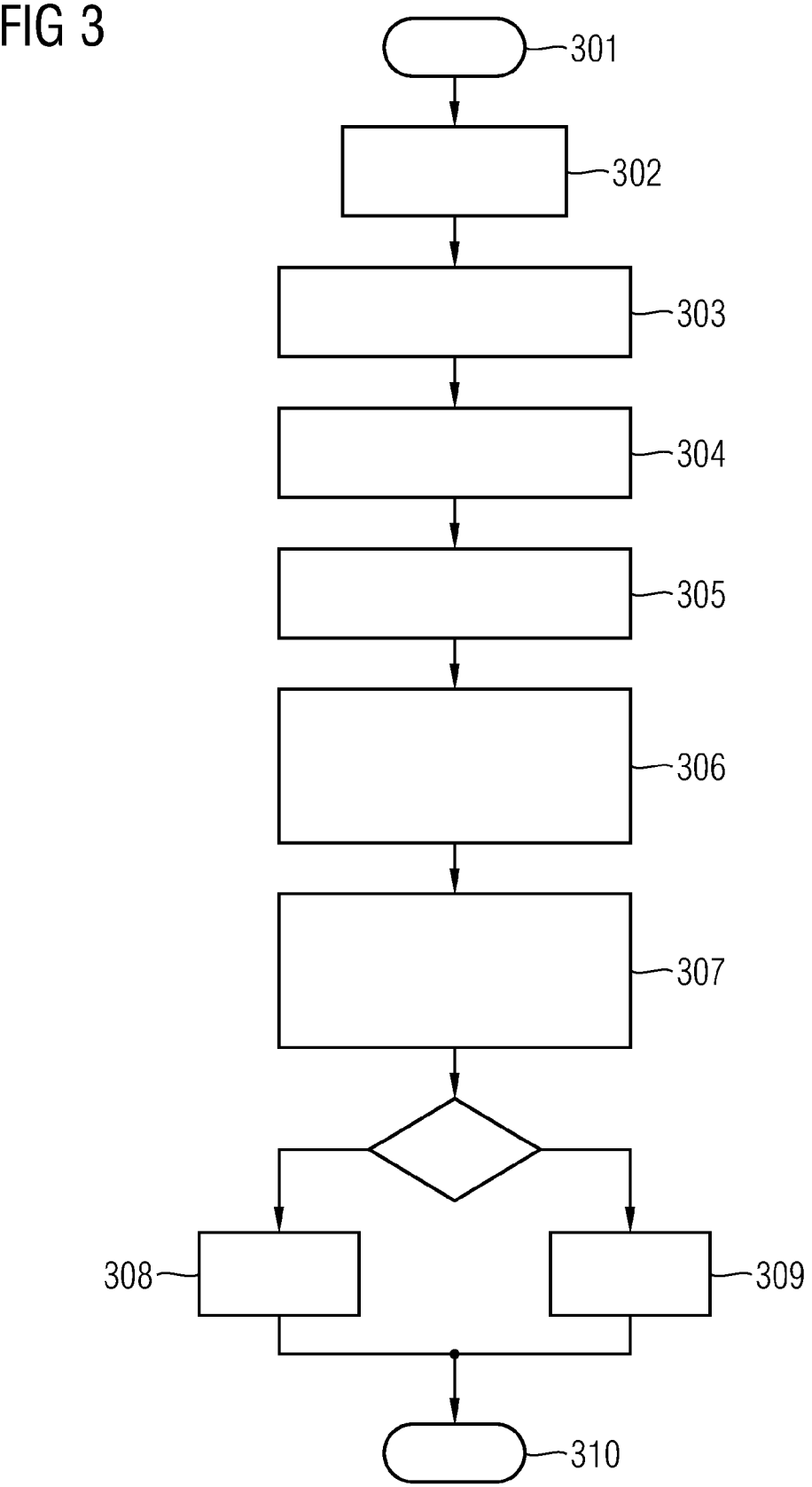
FIG. 3 shows a flow diagram of the method according to various embodiments.

FIG. 3 shows a flow diagram of an exemplary embodiment of the method for authentication of a user using a reading device and an electronic key. Following insertion 301 of the electronic key (an EC card here) into the card reading device (an automatic teller machine here), the EC card is first detected 302 as such by the automatic teller machine. The automatic teller machine then ascertains 303 from the inserted EC card which authentication variants are actually supported.

In particular, the presence of a smartcard chip is checked in this exemplary embodiment. This can involve various degrees of complexity, e.g. by detecting a contact pad for a chip at the designated position. This can be established e.g. by virtue of the presence of a galvanic connection and hence a current being able to flow. A further option is to detect the presence of smartcard chip communication, e.g. in the form of an ATR (answer to reset) message. It is also possible to read identification information from the smartcard chip, e.g. a serial number in the ATR message, and to compare this with checking information which is stored on the magnetic strip. Such a checksum is stored on the magnetic strip and evaluated, for example, or is calculated and evaluated by means of combined information that is stored partly on the magnetic strip and partly on the chip.

In the following step 304, an authentication variant is selected according to a defined rule (policy). This normally means that, if there is a plurality of authentication variants, the cryptographically most secure or strongest is selected. Following thereupon, the associated security information is read 305 via the associated interface. The authentication variants supported by the electronic key are then ascertained 306 on the basis of the security information.

Finally, the authentication method that was selected in step 304 and the supported authentication methods ascertained from the security information in step 306 are checked with reference to a checking rule in step 307. If the verification result does not conform to the checking rule 308, the method for authentication of a user is cancelled and an error message is displayed, for example. For example, this applies if a magnetic strip-based authentication method was selected but it is evident, on the basis of the security information and the checking rule, that both the reading device and the electronic key could apply a smartcard-based method.

However, if the verification result in the step 307 conforms to the checking rule, the authentication method is continued using the selected authentication method. The method terminates in step 310.

What is claimed is:

1. An electronic smartcard key for authentication of a user allowing access to an account, wherein the authentication can be authenticated by at least two authentication methods used by a single card reader, the electronic smartcard key comprising:
   a first authentication method comprising a first memory storing first identification information relating to the first authentication method,
   a second authentication method different than the first authentication method and comprising a second memory storing second identification information relating to the second authentication method,
   at least one interface for reading the first identification information from the electronic smartcard key, and
   a second interface for reading the second identification information from the electronic smartcard key,
   wherein the first identification information stored in the first memory includes information indicating that the electronic smartcard key supports authentication via the second authentication method and that the electronic smartcard key must be rejected if the single card reader does not detect the second authentication method on the electronic smartcard key, and
   wherein the second authentication method is stronger than the first authentication method.

2. The electronic key according to claim 1, wherein the at least one interface includes a contacted chipcard, contactless chipcard or magnetic strip.

3. The electronic key according to claim 1, wherein the integrity of the information relating to the support for the second authentication method is protected by a cryptographic checksum.

4. The electronic key according to claim 1, wherein additional information relating to the support for the second authentication method can be retrieved from a server.

5. The electronic key according to claim 1, wherein the first authentication method comprises at least one of a magnetic strip-based authentication method and a chipcard-based authentication method, and wherein the second authentication method comprises at least one of a magnetic strip-based authentication method and a chipcard-based authentication method.

6. A method for authentication of an electronic smart-card by means of a reading device and an electronic smart-card key, the method comprising the following steps carried out by the reading device:

ascertaining at least one first authentication method supported by the electronic smart-card key, selecting a first authentication method from the at least one supported first authentication method according to a predefinable rule, reading from a first memory of the electronic smart-card key security information relating to the selected first authentication method, the security information relating to the selected first authentication method including information for authenticating the electronic smart-card key via the selected first authentication method and information indicating that the electronic smart-card key supports authentication via a second authentication method, wherein the security information is readable via a first interface of the electronic smart-card key, ascertaining the second supported authentication method based on the reading of the security information from the first memory of the electronic smart-card key, verifying the selected first authentication method based on the second supported authentication method, according to a predefinable checking rule, and refusing authentication of the electronic smart-card key if the second supported authentication method is not detected on the electronic smart-card key by the reading device or the second supported authentication method fails.

7. The method according to claim 6, wherein the at least one interface of the electronic smart-card key includes at least one of a contacted chipcard, a contactless chipcard, and a magnetic strip.

8. The method according to claim 6, wherein the integrity of the first security information stored in the electronic smart-card key indicating that the electronic smart-card key supports authentication via the at least one second authentication method is protected by a cryptographic checksum.

9. The method according to claim 6, further comprising retrieving from a server the information stored in the electronic smart-card key indicating that the electronic smart-card key supports authentication via at least one other authentication method.

10. The method according to claim 6, wherein security information relating respectively to the first and second authentication methods is stored separately on the electronic key and is readable via different interfaces of the electronic key.

11. A system for authentication of a user, comprising:

an electronic smart-card key comprising:
  (a) a first authentication method comprising a first memory storing first security information relating to the first authentication method,
  (b) a second authentication method different than the first authentication method and comprising a second memory storing second security information relating to the second authentication method, said first and second security information are readable from said first or second memory via at least one interface, and the first security information stored in the first memory includes information indicating that the electronic smart-card key supports authentication via the second authentication method, a reading device configured to:

read the first security information relating to the first authentication method, including the information indicating that electronic smart-card key supports authentication via the second authentication method, and verify both the first and second authentication method, based on the information in the memories of the electronic smartcard key according to a predefinable checking rule, authenticate the electronic smart-card key only if both verification results conform to the checking rule.

12. The system according to claim 11, wherein the at least one interface of the electronic smart-card key includes at least one of a contacted chipcard, a contactless chipcard, and a magnetic strip.

13. The system according to claim 11, wherein the integrity of the first security information stored in the electronic smart-card key indicating that the electronic smart-card key supports authentication via the at least one second authentication method is protected by a cryptographic checksum.

14. The system according to claim 11, wherein the first security information stored in the electronic smart-card key indicating that the electronic smart-card key supports authentication via the at least one second authentication method can be retrieved from a server.

* * * * *